Patented June 22, 1954

UNITED STATES PATENT OFFICE 2,681,927

SEPARATION OF AMINO ACIDS

Elmer V. McCollum and Agatha A. Siegenthaler, Baltimore, Md., assignors to Research Corporation, New York, N. Y., a corporation of New York No Drawing. Application May 4, 1951, Serial No. 224,666

3 Claims. (Cl. 260—529)

This invention relates to a method for the separation of amino acids and particularly to the separation of amino acids from protein hydrolysates.

In general, the hydrolysis of proteins results in products containing a relatively large number of individual amino acids, eighteen in the case of casein hydrolysates, together with other non-amino-acid material.

We have found that by treatment of amino acids, such as the mixed amino acids obtained by the hydrolysis of proteins, under substantially anhydrous conditions with solutions in a lower alkyl ketone, such as acetone, of a wide range of organic acids, complexes of varying solubility in the ketone are formed which make possible the ready differential separation of the amino acids from each other and from non-amino acid substances. Dioxane may be used instead of the lower alkyl ketone.

Various organic acids such as the halogenated alkyl carboxylic acids, the organic acid phosphates, particularly the alkyl and aryl acid phosphates, and the organic sulfonic acids which are soluble in anhydrous acetone to the extent of at least about 1% at normal room temperature are useful in the method of the invention.

The principles of the invention may be applied in a wide variety of ways. The mixed amino acids may, for example, be subjected to differential fractional solution by treating the mixture in substantially dry form with successive portions of a solution of a suitable organic acid in acetone, or the entire amino acid content of the mixture may be brought into solution by treatment with a sufficient amount of the acetone-organic acid mixture and the amino acids differentially precipitated by gradually decomposing the amino acid-organic acid compound in successive increments.

In each case there is found to be a substantial segregation of the various amino acid components of the mixture in the successive dissolved or precipitated portions and by continuing the process in a systematic fractionation the individual amino acids may be segregated and isolated, or known methods of separating and isolating individual amino acids may be applied to the partially segregated mixtures of lesser complexity obtained by a primary fractionation by the method of the invention.

The decomposition of the amino acid compound in the acetone solution may be effected in a wide variety of ways some of which are of more particular interest in connection with particular organic acids. Of general utility is the decomposition of the compounds by passing ammonia gas into the acetone solution. This method is especially adapted for the controlled differential decomposition to produce successive amino acid fractions containing segregated amino acids or groups of amino acids. The decomposition may also be effected advantageously by passing hydrogen chloride into the solution, which is particularly suitable in the case of organic acids which form acetone-insoluble ammonium salts, such as 2,5-dichlorobenzenesulfonic acid, for example.

Differential separation of the dissolved amino acids may also be effected by adding to the acetone solution successive increments of a liquid miscible with acetone but in which the organic acid-amino acid compounds are insoluble, such as diethyl ether, petroleum ether or other liquid miscible with acetone.

The amino acids will precipitate spontaneously on standing from a trichloroacetic acid-acetone solution because of the gradual decomposition of the trichloroacetic acid into chloroform and carbon dioxide, and this spontaneous decomposition may be utilized either to separate the amino acids from successively dissolved fractions, or to obtain successive fractions of segregated amino acids from a solution of protein hydrolysate in an acetone-trichloroacetic acid mixture.

In general, when ammonia gas is added to solutions of amino acids in the organic acid-acetone mixture, the amino acids separate as such, but the basic amino acids may separate in the form of acid salts. Amino compounds such as trimethylamine, triethylamine and aniline may be used instead of ammonia.

Representative of the organic acids which may be used to form acetone-soluble complexes with amino acids in the method of the invention are—

Carboxylic acids:
Trichloroacetic acid
Dichloroacetic acid

Sulfonic acids:
Benzenesulfonic acid
dl-Camphorsulfonic acid
d-Camphorsulfonic acid
p-Toluenesulfonic acid
4-nitrochlorobenzenesulfonic acid
2-naphthalenesulfonic acid
5-nitro-o-toluenesulfonic acid
2,5-dibromobenzenesulfonic acid
5-nitronaphthalene-1-sulfonic acid
p-Cymenesulfonic acid
1,3-dimethylbenezene-4-sulfonic acid
2,6-diiodiphenol-4-sulfonic acid
Cyclohexanesulfonic acid
1-naphthalenesulfonic acid
Dibutyl-1-naphthalenesulfonic acid
Decylbenzenesulfonic acid
Dodecylbenzenesulfonic acid
2,5-dichlorobenzenesulfonic acid
3-nitro-p-toluenesulfonic acid
Di-isopropyl-2-naphthalenesulfonic acid Oleyl-methyltauric acid
Methylsulfonic acid
Ethylsulfonic acid
p-Chlorobenzenesulfonic acid
p-Nitrobenzenesulfonic acid
m-Nitrobenzenesulfonic acid

*Acid phosphates:*
Ethyl acid phosphate
n-Propyl acid phosphate
Isopropyl acid phosphate
n-Butyl acid phosphate
Isobutyl acid phosphate
n-Amyl acid phosphate
Isoamyl acid phosphate
Octyl acid phosphate
n-Hexyl acid phosphate
Methyl-isobutyl-methyl acid phosphate
Phenyl acid phosphate An 0.2-normal solution of the organic acid in acetone provides a suitable reagent mixture. For example, if 1 gram of dry acid hydrolysate of casein is dissolved in 100 ml. of 0.2 normal benzenesulfonic acid in acetone about 0.88 gram of amino acids are precipitated by the addition of dry ammonia to the solution. When single pure amino acids are dissolved in the same reagent mixture, approximately 100% of the amino acid is precipitated on passing ammonia gas into the solution.

The following specific examples are illustrative of the principles of the invention:

EXAMPLE I

*Separation of amino acids from casein hydrolysates*

Ten grams of a dry, finely ground acid hydrolysate of casein is mixed with 10 grams of "Drierite" (anhydrous calcium sulfate) and placed in an "M" porosity sintered glass crucible. The crucible is placed on a suction flask and the solid is washed with three successive 20 ml. portions of acetone. The hydrolysate is then extracted with thirty succesive 25 ml. portions of 0.2 N trichloroacetic acid in acetone. The mixture in the crucible is stirred with a glass rod after each addition of reagent to prevent clumping and caking of the solid. After each portion of the reagent has been drawn through the hydrolysate the receiver is changed. The reagent portions are then separately neutralized by the addition of anhydrous ammonia and the precipitates so formed are filtered and washed well with acetone.

Color tests show that in the fractions thus obtained arginine is segregated in the early fractions, methionine in a few of the middle fractions and tyrosine in the residue. In general, the fractions contain from three to eight amino acids, the earlier fractions being the more complex. In a single fractionation therefor a very substantial segregation of the eighteen amino acids contained in the original hydrolysate is obtained. The fractions may be subjected to further fractionation by the method of the invention or the individual amino acids may be separated from the relatively simple mixtures by known procedures.

A 0.2 N solution in acetone of any of the listed organic acids may be used in place of the trichloroacetic acid in the foregoing example. Marked differences exist in the differential solvent action of the various acids in acetone with respect to the various amino acids, and for any particular purpose the acid used in advantageously selected with respect to the composition of the material being treated and the particular amino acid or acids to be isolated in order to best accomplish the desired purpose.

The following tables show the amounts of various acids in 0.2 N solution in acetone required to dissolve one mole of the different amino acids:

*Table I*

MOLECULAR RATIOS REPRESENTING MINIMUM MOLES OF REAGENT ACID TO DISSOLVE ONE MOLE OF AMINO ACID IN ACETONE

| Amino acid | 2-Naphthalene-sulfonic acid | Cyclohexane-sulfonic acid | p-Cymene-sulfonic acid | 4-Nitrochloro benzene-2-sulfonic acid |
|---|---|---|---|---|
| Threonine | 1.4 | 1.6 | 1.4 | 1.7 |
| Valine | 1.6 | 8.4 | 1.6 | 1.6 |
| Glutamic acid | 1.8 | 2.9 | 2.6 | 2.1 |
| Hydroxyproline | 1.8 | 2.1 | 2.9 | 1.6 |
| Aspartic acid | 1.9 | 4.8 | 1.6 | 1.6 |
| Tryptophan | 2.9 | >20.4 | 2.0 | 1.2 |
| Norleucine | 3.1 | 7.1 | 1.3 | 2.6 |
| Serine | 4.0 | 11.1 | 1.7 | 1.9 |
| Proline | 4.6 | 0.9 | >12.4 | 1.4 |
| Leucine | 4.7 | 2.9 | 2.4 | 1.6 |
| Isoleucine | 4.7 | 5.2 | 1.3 | 1.8 |
| Cystine | 6.2 | 24.4 | 7.2 | 3.8 |
| Tyrosine | 6.5 | 6.5 | 2.1 | 1.8 |
| Glycine | 8.4 | 21.1 | >7.5 | 8.5 |
| Alanine | 9.1 | 8.0 | 1.8 | 1.2 |
| Phenyl alanine | 12.9 | >16.9 | 1.6 | 20.1 |
| Methionine | 13.4 | 13.8 | 1.5 | 1.8 |
| Arginine | >21.6 | 9.1 | 4.9 | 3.8 |
| Histidine | >18.6 | 8.4 | 3.7 | 31.4 |

*Table II*

| Amino Acid | Alkyl Acid Phosphate | | | | |
|---|---|---|---|---|---|
| | Octyl | n-Butyl | n-Amyl | Iso-propyl | n-Propyl |
| Proline | 1.6 | 1.6 | 1.8 | 2.1 | 5.1 |
| Isoleucine | 5.0 | 3.7 | 6.8 | 6.0 | 6.1 |
| Valine | 7.0 | 6.3 | 13.6 | 6.3 | 5.4 |
| Alanine | 8.6 | 5.3 | 8.6 | 6.1 | 7.3 |
| Leucine | 10.2 | 6.8 | 8.4 | >28 | 9.2 |
| Phenylalanine | 9.0 | 9.9 | 12.6 | 5.0 | 10.3 |
| Arginine | 10.5 | 6.3 | 72 | 53 | 14.6 |
| Hydroxyproline | 19.4 | 11.5 | 25 | 11.3 | 17.6 |
| Norleucine | 22.1 | 9.7 | 23 | 10.0 | 8.2 |
| Tryptophan | 23.1 | 4.5 | 13 | 5.3 | 5.3 |
| Histidine | 43 | 14.3 | 62 | 34 | 52 |
| Methionine | 52 | >28 | 16 | 11.9 | >60 |
| Threonine | 24 | 8.3 | 12.4 | 8.8 | 11.2 |
| Tyrosine | 72 | 51 | 41 | 31 | >87 |
| Serine | 67 | 67 | 35 | 19.5 | >55 |
| Glycine | >33 | 18 | 20 | 22.2 | >30 |
| Glutamic acid | >94 | 112 | 77 | 48 | >40 |
| Aspartic acid | >80 | 101 | >50 | >96 | >75 |
| Cystine | Insol. | Insol. | Insol. | Insol. | Insol. |

*Table III*

| Amino Acid | Moles of acid reagent in Acetone / Mole of amino acid | | |
|---|---|---|---|
| | Trichloroacetic acid (0.24 N) | dl-Camphorsulfonic acid (0.2 N) | Benzenesulfonic acid (0.4 N) |
| Proline | 4.5 | 1.1 | 1.0 |
| Threonine | 5.5 | 1.4 | 1.6 |
| Tyrosine | 68.0 | 1.4 | 1.4 |
| Isoleucine | 5.1 | 1.0 | 1.6 |
| Alanine | 5.0 | 1.6 | 1.8 |
| Valine | 5.1 | 1.4 | 1.8 |
| Aspartic acid | 53.0 | 1.6 | 2.0 |
| Phenylalanine | 5.2 | 0.9 | 3.2 |
| Serine | 20.0 | 0.8 | 3.4 |
| Hydroxyproline | 25.0 | 2.1 | 3.6 |
| Leucine | 5.4 | 1.6 | 4.2 |
| Norleucine | 5.4 | 1.3 | 7.4 |
| Tryptophan | 3.0 | 28.6 | 10.6 |
| Cystine | Insol. | 10.0 | 13.4 |
| Glycine | 4.2 | >22.5 | 16.2 |
| Glutamic acid | 55.0 | 1.7 | 44.0 |
| Methionine | 6.2 | 0.9 | 64.0 |
| Histidine | 6.8 | 3.7 | 128.0 |

EXAMPLE II

Preparation of lysine from casein hydrolysate

In the following procedure the raw material is "Hycase," a commercial acid hydrolysate of casein, freed from residual HCl by treatment with a synthetic resin. Twenty grams of the dry material are suspended in 450 ml. of a 0.5 N solution of benzenesulfonic acid in acetone. The suspension is dissolved by suitable agitation, the temperature being maintained at 8–10° C. If kept in a refrigerator and occasionally shaken, solution may require 3 or 4 days, but may be hastened by agitation. As solution progresses, a light, flaky precipitate is formed. The solution is diluted with acetone to approximately 0.1 N benzenesulfonic acid concentration to decrease the solubility of the lysine-benzenesulfonic acid precipitate. After standing in the cold for a few hours the precipitate is filtered off and washed with acetone. When freed from acetone this precipitate weighs about 4.0 grams. The precipitate is dissolved in water and decolorized with carbon black. When "Hycase" is used, the principal contaminant is calcium, which is removed by adding dilute solutions of NaOH and oxalic acid until one additional drop of either reagent fails to cause further precipitation. In this way only a slight excess of the reagents is added. Owing to the solubility of oxalic acid in acetone the excess is removed later along with the histidine compound of benzenesulfonic acid. The excess sodium is subsequently removed as sodium chloride during crystallization of the lysine monohydrochloride. During precipitation of the calcium, the solution is kept slightly acid to safeguard the lysine against change.

The decolorized calcium-free solution is evaporated to dryness in a current of air. The dry residue is ground in a mortar and suspended in 250 ml. of 0.25 N solution of trichloroacetic acid in acetone. After standing with occasional shaking for three or four hours, the suspension is filtered and the insoluble material tested for histidine by the Macpherson modification of the Pauly reaction. If the test is positive, the material is re-suspended in 25–50 ml. of 0.25 N trichloroacetic acid and the test repeated on the undissolved material. Ordinarily histidine is completely removed by the first treatment.

The material is then made into a slurry with 1 ml. concentrated HCl, and suspended in 250 ml. acetone. The insoluble material consists of lysine monohydrochloride, and may be further purified of contaminant, mainly NaCl, by re-crystallization in alcohol, or from water.

Lysine monohydrochloride as thus prepared contains 19.4% Cl and 15.3% N. (Theory: Cl. 19.36; N, 15.34%.) The specific rotation in NHCl at 19° C. is 21.4°. Chromatographic tests on paper indicate complete purity.

Experiments have shown that the method described in this example is also applicable to the separation of lysine from acid hydrolysates of whole beef blood, whole blood clot and serum.

EXAMPLE III

Preparation of glutamic acid from beet molasses

Ten grams of beet molasses are mixed with three grams of anhydrous calcium sulfate and twenty-five ml. of acetone. After one hour the acetone is decanted and the acetone removed from the water-free molasses by warming at 80° C. The dry material is then extracted with 180 ml. of 95% alcohol, applied in sixty milliliter portions. The alcoholic extract is evaporated (or distilled to recover the alcohol), and the resulting residue of alcohol-soluble material is mixed with anhydrous calcium sulfate, and extracted on a filtering crucible using suction with 10 ml. portions of a 0.2 N solution of benzenesulfonic acid in acetone, until the undissolved residue gives a negative reaction for amino acids when treated with ninhydrin. This operation is for the purpose of separating amino acids from alpha-pyrrolidonecarboxylic acid which is present in the molasses and which is dissolved by the alcohol treatment. The extraction of amino acids requires about 100 ml. of 0.2 N benzene sulfonic acid solution.

The undissolved residue (containing the alpha-pyrrolidonecarboxylic acid, and now free from amino acids, but containing some sugar or other carbohydrates) is then hydrolyzed with 2NHCl for 12 hours to convert the alpha-pyrrolidone carboxylic acid into glutamic acid. The HCl solution is evaporated to dryness, and after small additions of water is re-evaporated until the material is chloride-free, as shown by the silver nitrate test.

The dried, chloride-free material is then suspended in 25 ml. of 0.2 N solution of benzenesulfonic acid in acetone. The glutamic acid, formed from alpha-pyrrolidonecarboxylic acid, is dissolved while any carbohydrate present remains insoluble. The solution is then decanted and is treated with ammonia to precipitate the glutamic acid. The glutamic acid precipitate is well washed with acetone, freed from this solvent at 80° C., and weighed. The glutamic acid obtained by the above procedure may be contaminated with a small amount of aspartic acid. It weighs 0.15 gram. This yield corresponds to 35 pounds of glutamic acid per ton of molasses.

The glutamic acid thus obtained is free from carbohydrates, chlorides, ammonia, ash and betaine. The small contamination of aspartic acid may be removed by washing the product with a small amount (5–10 ml.) of 0.2 N benzenesulfonic acid in acetone, in which aspartic acid is considerably more soluble than is glutamic acid. Alternatively, the glutamic acid may be freed from aspartic acid by ordinary methods of re-crystallization.

Other chemical drying agents, such as anhydrous sodium sulfate, may be used instead of the anhydrous calcium sulfate or the molasses may be dried by other means, such as treatment with acetone which is circulated successively in contact with the molasses and with a chemical drying agent until the molasses is substantially anhydrous.

This application is a continuation-in-part of our application Serial No. 35,293 filed June 25, 1948, now abandoned.

We claim:

1. The method of separating lysine from lysine-containing protein hydrolysates which comprises treating the dry hydrolysate with a solution in a lower alkyl ketone of an organic acid forming acetone-soluble compounds wtih amino acids, separating from the liquid portion of the reaction mixture the lysine-acid compound thereby formed as a precipitate, and recovering lysine from the precipitate.

2. The method of separating lysine from lysine-containing protein hydrolysates which comprises treating the dry hydrolysate with a solution of benzenesulfonic acid in a lower alkyl ketone, separating from the liquid portion of the reaction mixture the lysine-benzenesulfonic acid compound thereby formed as a precipitate, and recovering lysine from the precipitate.

3. The method as defined in claim 2 wherein the recovered lysine is extracted with a lower alkyl ketone solution of trichloroacetic acid to remove histidine therefrom.

References Cited in the file of this patent

UNITED STATES PATENTS

| Number | Name | Date |
|---|---|---|
| 2,485,859 | Butturini et al. | Oct. 25, 1949 |

OTHER REFERENCES

Sadikov et al., Chem. Abstracts, vol. 31, col. 4355 (1937).

Fitzgerald, Trans. Roy. Soc. Canada, vol. 31, III, pp 153–7 (1937).